3,709,919
PRODUCTION OF METHANOL
Eugene F. Magoon, Walnut Creek, Calif., assignor to Shell Oil Company, New York, N.Y.
No Drawing. Filed Dec. 21, 1970, Ser. No. 100,399
Int. Cl. C07c 29/16
U.S. Cl. 260—449.5    4 Claims

ABSTRACT OF THE DISCLOSURE

Methanol is produced by reaction of carbon oxides and hydrogen in the presence of a copper-zinc-silver containing oxide catalyst.

BACKGROUND OF THE INVENTION

Methods for producing methanol by contacting carbon oxides, especially carbon monoxide, with hydrogen in the presence of metal oxide catalysts are known in the art. A commercial catalyst will typically contain zinc oxide and another metal compound as a promoter. For example, U.S. Pat. 2,904,575 discloses the production of methanol by the contacting of carbon oxides and hydrogen in the presence of a catalyst comprising a zinc oxide-chromia mixture. Production of methanol utilizing such catalysts suffers from the disadvantage of requiring high temperatures (350° C. to 400° C.) and high pressures (4000–5500 p.s.i.g.) in order to produce economically attractive yields of methanol. Operating at these temperatures and pressures requires large capital expenditures and results in high operating costs.

Copper itself is inactive as a catalyst for the production of methanol. Copper oxide, although quite active in catalyzing the reaction of carbon monoxide and hydrogen to form methanol, is ineffective as a catalyst because in the reaction environment it is easily reduced to elemental copper. It has long been known that combining a difficultly-reduced metal oxide with copper oxide can in some instances produced an effective catalyst. For example, combinations of copper oxide and zinc oxide have been used as catalysts for the production of methanol. However, a catalyst consisting only of the oxides of copper and zinc suffers several disadvantages. For example, below 275° C. the catalyst is inactive in reacting carbon monoxide and hydrogen to methanol. At temperatures above 300° C. the catalyst is not selective for the production of methanol as an exothermic methanation reaction becomes the dominant reaction at the higher temperatures.

It is known that a copper-zinc containing oxide catalyst can be improved by the inclusion of a third component in the catalyst. For example, U.S. Pat. 3,326,956 discloses an effective catalyst for methanol production consisting of oxides of copper, zinc and chromium. Other third components include metallic halides (U.S. Pat. 1,625,924), rare earth oxides (U.S. Pats. 1,791,568; 2,061,470; 2,904,575), and rare earth fluorides (U.S. Pat. 1,707,331).

Silver oxide, while long known to be an effective catalyst for the oxidation of methanol to formaldehyde, has been considered unsuitable as a catalyst for the production of methanol from carbon monoxide and hydrogen. See, for example, NATTA, Catalysis, vol. III, ch. 8, "Synthesis of Methanol," at p. 405. Silver oxide is ineffective as a catalyst because in the reaction environment it is easily reduced to metallic silver which is inactive. However, U.S. Pat. 1,818,165 describes a catalyst for the production of methanol as a combination of two or more metal oxides from the group of copper, silver, lead, zinc and cadmium reduced to their elemental metal form. However, the patent is silent with respect to any unusual benefit obtained by combinations of two or more of the metal oxides.

SUMMARY OF THE INVENTION

It has now been found that improved production of methanol is obtained by contacting carbon monoxide or a mixture of carbon oxides with hydrogen, at elevated temperature and pressure, in the presence of a catalyst composition consisting essentially of the oxides of copper, zinc, and silver. The catalyst composition is characterized by a high level of conversion of reactants to methanol at comparatively low pressures and temperatures. For example, a mixture of copper oxide and silver oxide was inactive as a catalyst for the production of methanol from carbon monoxide and hydrogen in the temperature range of from about 150° C. to about 375° C., as was a mixture of zinc oxide and silver oxide. A catalyst composition consisting of oxides of copper and zinc exhibited some activity but was generally poor. It was inactive below 275° C. and at temperatures above 300° C. catalyzed an undesirable exothermic methanation reaction. In the narrow temperature range where the Cu/Zn containing oxide catalyst did exhibit some activity for the production of methanol, the conversion of reactants was low and the yield of methanol was only 0.31 kilogram/liter of catalyst/hour.

The inclusion of silver oxide in the catalyst composition yielded a much more active catalyst. At 275° C. the silver-containing oxide catalyst composition converted 12.5% of the reactants and resulted in a yield of methanol of 0.55 kilogram/liter of catalyst/hour.

DESCRIPTION OF THE PREFERRED EMBODIMENT

Process description

The improved process of the invention is conducted by intimately contacting carbon monoxide or a mixture of carbon oxides with hydrogen in the presence of a catalyst consisting essentially of the oxides of copper, zinc and silver. It appears likely that the reaction responsible for the formation of methanol in the process of the invention is represented by the equation given below:

$$CO + 2H_2 \rightleftharpoons CH_3OH$$

However, other carbon oxides and hydrogen compounds are suitably utilized as carbon monoxide and hydrogen precursors. For example, the following reactions are known to occur at elevated temperature:

$$CO + H_2O \rightleftharpoons CO_2 + H_2$$

$$CO_2 + H_2 \rightleftharpoons CO + H_2O$$

Thus, a mixture of an excess of carbon monoxide and water, or alternatively, a mixture of carbon dioxide and an excess of hydrogen may be used for the reaction to produce methanol. However, the utilization of such precursor mixtures offer no apparent advantage. Accordingly, the use of carbon monoxide and hydrogen for reaction to methanol is preferred. However, the presence of some carbon dioxide in the reaction mixture of carbon monoxide and hydrogen enhances the activity of the copper-zinc-silver containing oxide catalyst. For this reason, it is occasionally an advantage to have some carbon dioxide present in the reactant gaseous mixture, for example, up to about 50% by weight of the total carbon oxide mixture.

From stoichiometric considerations of the reaction, as depicted above, 2 moles of hydrogen react with 1 mole of carbon monoxide to produce methanol. When carbon dioxide is present, the stoichiometric considerations depicted above require an additional 3 moles of hydrogen per mole of whatever carbon dioxide is present to carry out the reaction to methanol. In practice, however, other ratios of reactants give satisfactory results and in some instances are to be preferred. Molar ratios of hydrogen to carbon oxides from about 2:1 to about 10:1 are satisfactory with best results being obtained when an excess of hydrogen over stoichiometric amounts is used.

The catalyst

The catalyst composition employed in the production of methanol by the process of this invention comprises a mixture of copper oxide and zinc oxide, modified by the presence therein of silver oxide. Although the role of silver oxide is not known with certainty, it is evident that it plays a substantial role in providing a catalyst composition which exhibits high activity for the production of methanol from carbon monoxide and hydrogen, or from precursors thereof, at comparatively low temperatures and pressures.

The precise amount of silver oxide is not critical. In general, amounts of silver oxide of from about 10% to about 35% by weight, based on total catalyst composition and calculated as metal, are satisfactory, with amounts of from about 15% to about 25% by weight, on the same basis, being preferred.

The relative proportions of copper oxide to zinc oxide to be employed in the catalyst composition can be varied, but ratios from about 1:10 to about 20:1, calculated as weight percent metal, are satisfactory with ratios of from about 1:1 to 10:1, calculated on the same basis, being preferred.

The form in which the copper, zinc and silver are employed is the oxide, although compounds which are readily converted to the oxide, e.g., the corresponding metal carbonates, are also suitably initially employed as these are typically converted to the oxide, e.g., as during pretreatment subsequent to the formation of the initially prepared catalyst composition, but prior to use.

The catalyst composition is preferably prepared by co-precipitating the metals from a solution of their nitrates in the form of one or more compounds readily convertible to oxides and calcining the resulting precipitate. For example, the mixed nitrates may be combined with a solution of a carbonate to co-precipitate the metals or carbonates. The precipitation should be effected at a temperature of about 85° C.–90° C. The precipitate thus obtained is a mixture of carbonates, basic carbonates and hydroxides. It is collected on a filter, washed substantially free of electrolytes, then dried and calcined at a temperature of from about 200° C. to about 400° C., a temperature of from about 250 to about 300° C. being preferred. The calcined material is formed by, for example, pelleting under pressure using graphite as a lubricant. The oxide mixture, in some instances, is pretreated to bring it to its most active state. Pretreatment is accomplished by passing a stream of hydrogen or hydrogen mixed with carbon monoxide over the catalyst.

In some applications it might be preferable to employ the catalyst on an inert, neutral support, e.g., silica, alumina, or the like, but in the preferred modification, the catalyst is employed unsupported.

Process conditions

The process of the invention is conducted in the vapor phase at elevated temperature and pressure. Reaction temperatures are not critical and temperatures from about 200° to about 350° C. are satisfactory, with the temperature range from about 225° C. to about 300° C. being preferred. The reaction pressure to be employed will depend chiefly upon the temperature employed as well as the quantity and ratio of the reactants present, as in most cases the reaction pressure approximates the summation of the partial pressures of the individual reactants present. From the stoichiometric considerations depicted above, it is apparent that methanol production is favored at high pressures. However, economic considerations often dictate that the reaction be conducted at lower pressures.

The high activity of the copper-zinc-silver containing oxide catalyst makes it possible to carry out the reaction at comparatively low pressure and thus realize economic savings. Although the catalyst functions at pressures of from about 15 p.s.i.g. to about 5,000 p.s.i.g., it is preferable to carry out the reaction at a pressure of from about 500 p.s.i.g. to about 1,000 p.s.i.g.

In one modification of the instant process, inert diluent is present, e.g., a diluent such as argon, helium, nitrogen, methane and the like, which is gaseous at reaction temperature. These diluents are not deleterious to the catalyst; however, sulfur and other catalyst poisons, as well as reactive materials such as oxygen, which would interfere with the desired reaction, should be excluded. In the preferred modification of the process of the invention, the reactants and catalyst are contacted in the substantial absence of added inert diluent and in an inert reaction environment.

The process is adaptable for operation in a batchwise manner, as by charging the reactants and catalyst to an autoclave or similar pressure reactor which is maintained at reaction temperature until reaction is complete. Preferably, however, the process is conducted in a continuous manner as by passing the reactants through a tubular reactor containing the catalyst and maintained at reaction temperature. By either method, one reactant may be added to the others in increments, as by adding one reactant to the reaction mixture at intervals while the mixture is passing through a continuous-process reactor. It is equivalently useful to initially mix the entire amounts of reactants.

The space velocity at which the reactants contact the catalyst in a continuous process is conveniently in the range of 5,000 to 50,000 volumes of reactants per volume of catalyst per hour, measured at a standard pressure of one atmosphere and a standard temperature of 0° C. However, greater or lesser space velocities may be utilized if desired.

Subsequent to reaction, the product mixture is separated and the methanol is recovered by conventional methods, e.g., selective condensation, selective adsorption and the like.

The product of the invention, methanol, is a chemical of commerce, useful, for example, as a solvent and as a chemical intermediate in the manufacture of formaldehyde, a basic raw material for certain synthetic resins, plastics and adhesives.

To further illustrate the improved process of the invention, the following examples are provided. It should be understood that the details thereof are not to be regarded as limitations, as they may be varied as will be understood by one skilled in this art.

EXAMPLE I

A gas mixture of hydrogen and carbon monoxide in a molar ratio of 2 to 1 was introduced into a continuous reactor at 275° C. and at a pressure of 750 p.s.i.g. to contact a catalyst containing oxides of copper, zinc, and silver wherein the ratio of Cu:Zn:Ag was 58.1/23.5/19.4. The reactants were passed over the catalyst at a space velocity of 9,600 volumes of reactants per volume of catalyst per hour, measured at standard conditions. The conversion of carbon monoxide to methanol was found to be 12.8% by volume.

The reaction product was collected, condensed, and the liquid product analyzed. It was determined that the yield of liquid product was 0.55 kilogram per liter of catalyst per hour and the product analyzed 98.7% methanol. The organic impurities were 0.7%.

EXAMPLE II

A series of runs was made wherein the copper-zinc-silver containing oxide catalyst was compared with catalyst mixtures of any two of the components. The test procedure was otherwise the same as described in Example I. The tested combinations of Cu/Ag and Zn/Ag as oxides were inactive as catalysts for the production of methanol. A mixture of copper oxide and zinc oxide was a poor catalyst, although it did exhibit some catalytic activity. The catalyst containing oxides of copper, zinc and silver exhibited a much greater activity for the production of methanol. The data are presented in Table I.

TABLE I

| Oxide Catalyst | Temperature, °C. | Pressure, p.s.i.g. | GHSV ×10⁻³ | Conversion, percent vol. | Yield, kg./l./hr | Product composition, percent wt. | | | |
|---|---|---|---|---|---|---|---|---|---|
| | | | | | | Methanol | Ethanol | Higher organics | Water |
| Cu/Ag (69/31) | 150-375 | 750 | 10.0 | 0 | 0 | | | | |
| Zn/Ag (64.4/35.6) | 150-375 | 750 | 10.0 | 0 | Trace | | | | |
| Cu/Zn (70.2/29.8) | 250 | 750 | 14.0 | 0 | Trace | | | | |
| Cu/Zn (70.2/29.8) | 275 | 750 | 15.5 | 4.5 | 0.31 | 89.7 | 0.6 | 0.7 | 9.0 |
| Cu/Zn/Ag (58.1/23.5/19.4) | 250 | 750 | 10.0 | 7.2 | 0.32 | 991.1 | 0.2 | Trace | 0.7 |
| Cu/Zn/Ag (58.1/23.5/19.4) | 275 | 750 | 9.6 | 12.8 | 0.55 | 98.7 | 0.7 | Trace | 0.6 |
| Cu/Cd/Cr (63/27.3/9.7) | 325 | 750 | 10.0 | <1.0 | 0.05 | | | | |
| Cu/Cr (67/8/32.2) | 350 | 750 | 7.6 | 3.6 | 0.13 | 92.6 | 1.3 | 1.4 | 4.7 |

I claim as my invention:

1. The process of preparing methanol by intimately contacting carbon monoxide and hydrogen, wherein the molar ratio of hydrogen to carbon monoxide is at least 2:1, in the presence of a catalyst composition consisting essentially of the oxides of copper, zinc and silver wherein silver oxide is present in an amount from about 10% to about 35% by weight, based on total catalyst composition and calculated as weight percent metal and wherein the proportion of copper oxide to zinc oxide is from about 1:10 to about 20:1 calculated as weight percent metal at a temperature of from about 200° C. to about 350° C. and at a pressure of from about 500 p.s.i.g. to about 1000 p.s.i.g.

2. The process of claim 1 wherein the silver oxide constituent of the catalyst is in the range of from about 15% to about 25%, calculated as weight percent metal.

3. The process of claim 2 wherein the proportion of cooper oxide to zinc oxide in the catalyst composition is in the range of from about 1:1 to about 10:1, calculated as weight percent metal.

4. The process of claim 1 wherein the temperature is from about 225° C. to about 300° C. and the pressure is from about 500 p.s.i.g. to about 1000 p.s.i.g.

References Cited

UNITED STATES PATENTS

| 1,625,924 | 4/1927 | Woodruff et al. | 260—449.5 |
| 1,625,928 | 4/1927 | Woodruff et al. | 260—449.5 |
| 1,818,165 | 8/1931 | Schmidt et al. | 260—449.5 |
| 1,746,781 | 2/1930 | Lazier | 260—449.5 |
| 3,326,956 | 6/1967 | Davies et al. | 260—449.5 |

FOREIGN PATENTS

| 580,905 | 11/1924 | France | 260—449.5 |
| 229,715 | 2/1925 | Great Britain | 260—449.5 |

HOWARD T. MARS, Primary Examiner

U.S. Cl. X.R.

212—475